(12) United States Patent
Peng et al.

(10) Patent No.: US 12,353,202 B2
(45) Date of Patent: Jul. 8, 2025

(54) AUDIO-BASED DEVICE FAULT DETECTION METHOD, ELECTRONIC DEVICE AND STORAGE MEDIUM (71) Applicant: ZHEJIANG HENGYI PETROCHEMICAL CO., LTD., Zhejiang (CN)

(72) Inventors: Xiantao Peng, Hangzhou (CN); Peng Wang, Hangzhou (CN); Yibo Qiu, Hangzhou (CN); Dake Li, Hangzhou (CN); Junwei Zhang, Hangzhou (CN); Zhangzhong Cheng, Hangzhou (CN); Jianjun Sheng, Hangzhou (CN)

(73) Assignee: ZHEJIANG HENGYI PETROCHEMICAL CO., LTD., Zhejiang (CN)

( * ) Notice: Subject to any disclaimer, the term of this patent is extended or adjusted under 35 U.S.C. 154(b) by 0 days.

(21) Appl. No.: 18/893,399

(22) Filed: Sep. 23, 2024

(65) Prior Publication Data
US 2025/0181065 A1 Jun. 5, 2025

(30) Foreign Application Priority Data
Dec. 4, 2023 (CN) .......................... 202311671046.1

(51) Int. Cl.
G05B 23/02 (2006.01)
G06F 16/683 (2019.01)

(52) U.S. Cl.
CPC ....... G05B 23/0275 (2013.01); G05B 23/027 (2013.01); G06F 16/683 (2019.01)

(58) Field of Classification Search
CPC .. G05B 23/0275; G05B 23/027; G06F 16/683
See application file for complete search history.

(56) References Cited

U.S. PATENT DOCUMENTS

2018/0371661 A1 12/2018 Hara et al.
2019/0325868 A1 10/2019 Lecue et al.
(Continued)

FOREIGN PATENT DOCUMENTS

CN 108802540 A 11/2018
CN 113283704 A 8/2021
(Continued)

OTHER PUBLICATIONS

Shi et al., "Agglomeration Monitoring of Fluidized Bed Reactor Based on Voiceprint Feature Extraction," IMCEC 2018. pp. 657-662. (Year: 2018).*
(Continued)

Primary Examiner — Ricky Go
(74) Attorney, Agent, or Firm — Banner & Witcoff, Ltd.

(57) ABSTRACT

Provided is an audio-based device fault detection method, an electronic device, and a storage medium, relating to the field of data processing and in particular to technical fields of deep learning and voice technology. The method includes: obtaining initial audio data collected by a drone for a target device; preprocessing the initial audio data to obtain audio data to be detected; performing feature extraction on the audio data to be detected to obtain an audio feature of the audio data to be detected; constructing an information graph based on the audio feature; and obtaining a fault detection result for the target device based on the information graph and a graph neural network model.

18 Claims, 6 Drawing Sheets

(56) References Cited

U.S. PATENT DOCUMENTS

| | | |
|---|---|---|
| 2020/0328701 A1 | 10/2020 | Park et al. |
| 2021/0263511 A1* | 8/2021 | Singh ................ G05B 23/0227 |

FOREIGN PATENT DOCUMENTS

| | | | | |
|---|---|---|---|---|
| CN | 113409818 A | | 9/2021 | |
| CN | 110534118 B | * | 10/2021 | ............ G10L 17/18 |
| CN | 114067829 A | * | 2/2022 | |
| CN | 114372409 A | | 4/2022 | |
| CN | 114689315 A | | 7/2022 | |
| CN | 117071096 A | | 11/2023 | |
| CN | 117074809 A | | 11/2023 | |
| JP | 2010025715 A | | 2/2010 | |
| JP | 2016099938 A | | 5/2016 | |
| JP | 2019125319 A | | 7/2019 | |
| JP | 2020201937 A | | 12/2020 | |
| JP | 2021056880 A | | 4/2021 | |
| JP | 2021111063 A | | 8/2021 | |
| JP | 2021135585 A | | 9/2021 | |
| JP | 2022105263 A | | 7/2022 | |
| JP | 2023095030 A | | 7/2023 | |
| JP | 2023106043 A | | 8/2023 | |
| WO | 2020009210 A1 | | 1/2020 | |
| WO | 2020255206 A1 | | 12/2020 | |
| WO | 2022259446 A1 | | 12/2022 | |

OTHER PUBLICATIONS

Machine Translation CN110534118B (Year: 2021).*
Machine Translation CN114067829A (Year: 2011).*
Ghasemi et al., Application of Hybrid Wavelet-SVM Algorithm to Detect Broken Rotor Bars in Induction Motors, 978-1-7281-9023-5/21 © 2021 IEEE.
Bin et al., Application of MCKD and RSSD in Early Fault Diagnosis of Rolling Bearings, vol. 38, No. 2, Apr. 2018, Noise and Vibration Control, 1006-1355 (2018)02-0154-08.
Notification on Grant of the Patent Right for Invention and Search Report—App No. 2023116710461 dtd Jan. 18, 2024.
Jan. 23, 2025—(JP) Notice of Allowance—App. No. JP2024188079.
Jan. 31, 2025—(EP) Extended European Search Report—App. No. EP24202060.0.
Zhang et al., Intelligent acoustic-based fault diagnosis of roller bearings using a deep graph convolutional network, Measurement, vol. 156, 107585, pp. 1-9, https://doi.org/10.1016/j.measurement.2020.107585.
Nov. 7, 2024—(JP) First Office Action—App. No. JP2024188079.

* cited by examiner

AUDIO-BASED DEVICE FAULT DETECTION METHOD, ELECTRONIC DEVICE AND STORAGE MEDIUM

CROSS-REFERENCE TO RELATED APPLICATIONS

The present application claims priority to Chinese Patent Application No. CN202311671046.1, filed with the China National Intellectual Property Administration on Dec. 4, 2023, the disclosure of which is hereby incorporated herein by reference in its entirety.

TECHNICAL FIELD

The present disclosure relates to the field of data processing, and in particular to technical fields of deep learning and voice technology.

BACKGROUND

In the industrial scenario of spinning process, since the spinning process is long and complicated and involves a relatively large number of process devices, anomalies may occur in the devices during the operations of the process devices. The manual troubleshooting method is labor-intensive, so how to automatically perform the fault detection on devices is a problem currently faced.

SUMMARY

The present disclosure provides an audio-based device fault detection method and apparatus and a related device, to solve or alleviate one or more technical problems in the related art.

In a first aspect, the present disclosure provides an audio-based device fault detection method, including:
  obtaining initial audio data collected by a drone for a target device;
  preprocessing the initial audio data to obtain audio data to be detected;
  performing feature extraction on the audio data to be detected to obtain an audio feature of the audio data to be detected;
  constructing an information graph based on the audio feature; and
  obtaining a fault detection result for the target device based on the information graph and a graph neural network model.

In a second aspect, the present disclosure provides an audio-based device fault detection apparatus, including:
  a first collection module configured to obtain initial audio data collected by a drone for a target device;
  a preprocessing module configured to preprocess the initial audio data to obtain audio data to be detected;
  a feature extraction module configured to perform feature extraction on the audio data to be detected to obtain an audio feature of the audio data to be detected;
  a construction module configured to construct an information graph based on the audio feature; and
  a detection module configured to obtain a fault detection result for the target device based on the information graph and a graph neural network model.

In a third aspect, provided is an electronic device, including:
  at least one processor; and
  a memory connected in communication with the at least one processor;
  where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

Based on the method provided by the embodiment of the present disclosure, the real-time situation of the device can be reflected with the help of the audio feature of the audio data. Therefore, the automatic fault detection of the device can be achieved to save human resources.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

In the description of the present invention, it should be understood that the orientation or position relationship indicated by the terms "center", "upper", "lower", "left", "right", "vertical", "horizontal", "inner", "outer", etc. is the orientation or position relationship shown based on the drawings, and is only for the purpose of facilitating the description of the present invention and simplifying the description, rather than indicating or implying that the device or element referred to must have a particular orientation or be constructed and operate in a particular orientation, and thus should not be construed as the limitation on the present invention.

It should be noted that the terms such as "first", "second" and the like in the specification and claims of the present application and the above drawings are used to distinguish the similar objects, but not necessarily to describe a particular order or sequence. It should be understood that the data used in this way is interchangeable under appropriate circumstances, so that the embodiments of the present application described herein can be implemented in an order other than those illustrated or described herein. The implementations described in the following exemplary embodiments do not represent all the implementations consistent with the present application. On the contrary, they are only the examples of the devices and methods which are detailed in the attached claims and consistent with some aspects of the present application.

Figure 1:
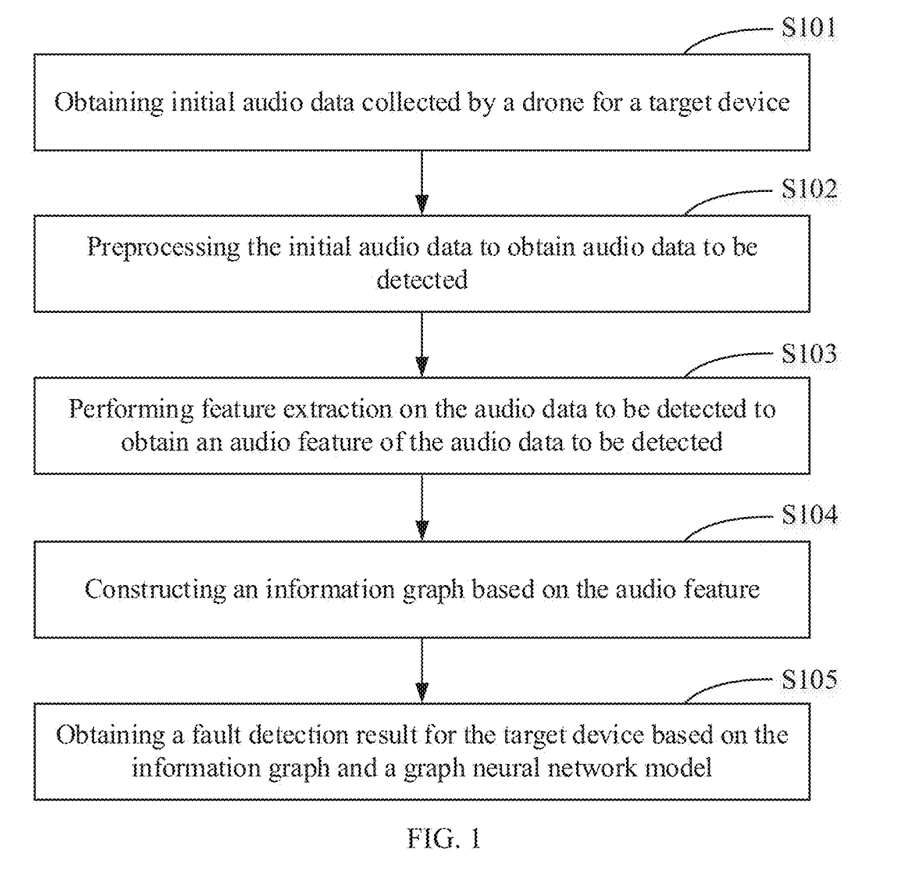
FIG. 1 is a schematic flow chart of an audio-based device fault detection method according to an embodiment of the present disclosure.

In the industrial scenario of spinning process, since the spinning process is long and complicated and involves a relatively large number of process devices, anomalies may occur in the devices during the operations of the process devices. In order to ensure the normal operation of the spinning process, a drone is used in the embodiments of the present disclosure to monitor the audio data of the process device in real time to ensure the normal operation of the spinning process. An embodiment of the present disclosure proposes an audio-based device fault detection method, as shown in FIG. 1, which may be implemented as follows:

S101: obtaining initial audio data collected by a drone for a target device.

Since there is flowing liquid in a pipe of a process device, a microphone device of the drone may be used to perform collection on a detection point of the target device. One target device may have a plurality of detection points, and each detection point may be sampled multiple times to obtain the initial audio data.

S102: preprocessing the initial audio data to obtain audio data to be detected.

S103: performing feature extraction on the audio data to be detected to obtain an audio feature of the audio data to be detected.

S104: constructing an information graph based on the audio feature.

S105: obtaining a fault detection result for the target device based on the information graph and a graph neural network model.

The fault detection result of the target device may include a normal state and an abnormal state. Here, the abnormal state may include 1-level anomaly, 2-level anomaly, . . . , S-level anomaly. The specific level of the abnormal state may be determined based on actual conditions, and is not limited in the embodiment of the present disclosure.

Based on different levels of abnormal states, different processing methods may be set for the abnormal state at each level. For example, the 1-level anomaly is that the audio data exceeds the normal range by a relatively small amount, that is, a minor anomaly, and the device may be checked when the device is idle; the S-level anomaly is that the audio data exceeds the normal range by the most amount, that is, the most serious abnormal situation, and it is necessary to notify the staff timely to suspend the operation of the device and deal with the device timely.

In the embodiment of the present disclosure, the drone is used to monitor the audio data of the device to obtain the initial audio data; the initial audio data is preprocessed to obtain the audio data to be detected; the feature extraction is performed on the audio data to be detected to obtain the audio feature of the audio data to be detected; and the fault detection result for the target device is obtained based on the information graph constructed by the audio feature and the graph neural network model. The real-time situation of the device can be reflected with the help of the audio feature of the audio data. Therefore, the automatic fault detection of the device can be achieved to save human resources.

In some embodiments, the initial audio data of a reactor is collected by: controlling the drone to execute an operation plan to obtain the initial audio data; where the operation plan includes inspection time, location information of the reactor, and a requirement for the collected initial audio data.

For example, for a reactor 001 (representing a first esterification reactor in workshop A of a factory), the drone took the first sample at 15:45:06 on November 19 to obtain a first audio sequence, took the second sample at 15:45:08 on November 19 to obtain a second audio sequence, and took the m-th sample at 16:35:05 on November 19 to obtain an m-th audio sequence. That is, the obtained initial audio data may be expressed as $\{001;$ first audio sequence: $\{1119154506\}: \{x_{1,1}, x_{1,2}, \ldots, x_{1,n}\}$; second audio sequence: $\{1119154508\}: \{x_{2,1}, x_{2,2}, \ldots, x_{2,n}\}; \ldots;$ m-th audio sequence: $\{1119163505\}: \{x_{m,1}, x_{m,2}, \ldots, x_{m,n}\}\}$. Here, $x_{1,1}$ represents the sampling data of the first audio sequence at the data moment $x_1$, $x_{1,2}$ represents the sampling data of the first audio sequence at the data moment $x_2$, and so on. $x_{2,1}$ represents the sampling data of the second audio sequence at the data moment $x_1$, $x_{2,2}$ represents the sampling data of the second audio sequence at the data moment $x_2$, and so on.

In an embodiment of the present disclosure, when the drone is used to collect the audio data, the inspection time and the location information of the reactor are collected simultaneously, so as to provide a basis for determining which device has a fault.

In some embodiments, the step of preprocessing the initial audio data to obtain the audio data to be detected may be implemented as follows:

Step A1: processing the initial audio data based on noise suppression and a silence detection method to obtain first audio data.

In one embodiment, a noise suppression algorithm, for example, mean filtering, median filtering, etc., may be applied to the initial audio data, to reduce noise in the initial audio data. Then, the initial audio data is analyzed based on the silence detection method to identify a silence segment. Commonly used silence detection methods include an energy-based method, a spectral entropy-based method, etc.

The identified silence segment is filtered. The processed audio data is fused to obtain the first audio data.

In another embodiment, the Hidden Markov Model (HMM) may also be used to perform noise reduction on the initial audio data to obtain the first audio data. The HMM is a method that can be used for speech signal processing, and can model a speech signal to map the speech signal from high-dimensional space to low-dimensional space, thus reducing the dimensionality of the audio signal while retaining the speech feature of the sound signal.

Figure 2:
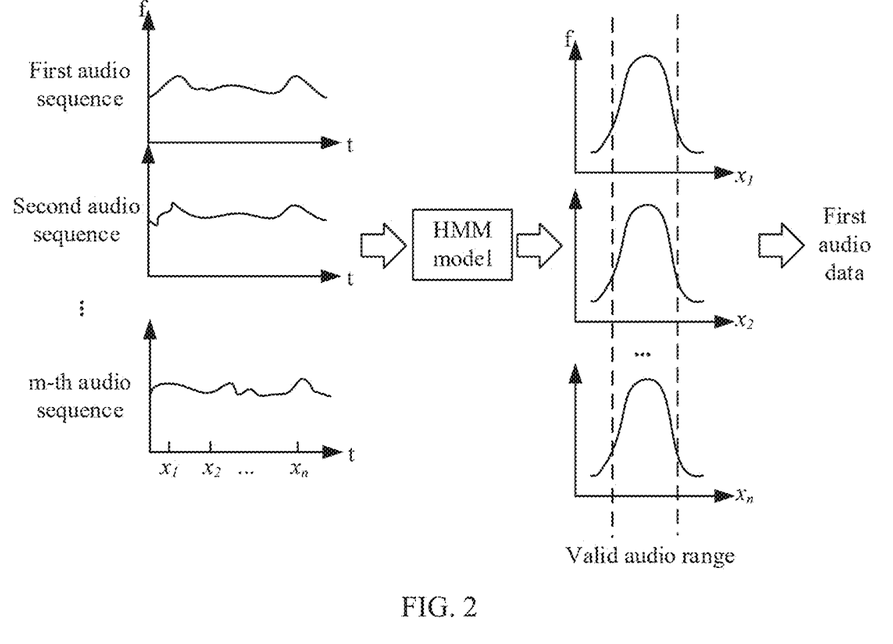
FIG. 2 is a schematic diagram of obtaining the first audio data according to an embodiment of the present disclosure.

During implementation, the initial audio data is obtained by sampling the detection point multiple times or by sampling multiple detection points, so the initial audio data is composed of multiple groups of audio sequences (each audio sequence can be understood as a continuous audio segment). As shown in FIG. 2, the first audio sequence may be expressed as $\{x_{1,1}, x_{1,2}, \ldots, x_{1,n}\}$, the second audio sequence may be expressed as $\{x_{2,1}, x_{2,2}, \ldots, x_{2,n}\}$, and the m-th audio sequence may be expressed as $\{x_{m,1}, x_{m,2}, \ldots, x_{m,n}\}$. The multiple groups of audio sequences are input into the HMM model so that the HMM model processes them. The noise reduction and dimensionality reduction are performed on the frequency feature at each data moment in the audio data, to obtain the normal distribution of each data moment; and a valid audio range is screened out from the normal distribution of each data moment, to form an audio sequence and thus obtain the first audio data.

In addition to the above-mentioned HMM model, the Principal Component Analysis (PCA), Independent Component Correlation Algorithm (ICA) and Linear Discriminant Analysis (LDA) may be used to denoise the initial audio data to obtain the first audio data.

Here, the PCA is a commonly-used method for data dimensionality reduction. The main components in the data can be found, and the data is mapped from high-dimensional space to low-dimensional space while maintaining most of the variance information in the data. For the sound data, the PCA can be used to reduce the dimensionality of the time-domain and frequency-domain data of the audio signal.

Here, the ICA is a method that can be used for signal processing and image processing. The independent components in a signal can be found, and the signal is mapped from high-dimensional space to low-dimensional space. For the sound data, the ICA can be used to reduce the dimensionality of the audio signal while retaining the main features of the sound signal.

Here, the IDA is a method that can project high-dimensional data into a low-dimensional space. By finding the optimal projection direction, the data is mapped from the original space to the low-dimensional space while maintaining the inter-class divergence in the data. For the sound data, the LDA can be used to reduce the dimensionality of the audio signal while retaining the category information of the sound signal.

In the embodiment of the present disclosure, the manner to denoise the initial audio data can be flexibly selected according to actual usage requirements.

Step A2: performing frame division on the first audio data to obtain second audio data.

During implementation, in order to facilitate post-processing, the first audio data may be divided into short time frames. A window with a length of 10 to 30 milliseconds is usually used for frame division, and there may be overlap between adjacent frames. The second audio data thus obtained includes multiple frames of audio data.

Step A3: processing the second audio data using a window function to obtain third audio data.

Each frame of audio data is processed using the window function to obtain the third audio data. For example, the window function such as Hamming window or Haining window may be used to reduce the amplitude jump at both ends of a frame.

Step A4: converting the third audio data into a frequency domain to obtain the audio data to be detected.

The third audio data may be converted into the frequency domain using fast Fourier transform, to obtain the audio data to be detected.

On the basis of converting the third audio data into the frequency domain, the frequency-domain signal may be filtered, spectrally subtracted, equalized, etc. according to actual conditions to enhance relevant features or suppress noise, thereby obtaining the audio data to be detected.

In the embodiment of the present disclosure, the data collected by the drone is preprocessed to achieve the purpose of denoising the initial audio data and removing the silent audio, enhancing the valid data portion in the audio data, and providing the valid audio data for subsequent fault detection of the device.

In some embodiments, the audio feature includes at least one of: frequency feature, duration feature, and intensity feature, etc.

During implementation, since the audio data to be detected is spectrum data, the feature extraction may be performed directly on the audio data to be detected, to obtain the frequency feature of the audio data to be detected. Here, the frequency feature may be spectrum peak, spectrum center of gravity, frequency entropy, Mel-frequency cepstral coefficients (MFCC), Mel-frequency cepstral coefficients (MFC) or other information.

The duration feature may be determined based on the duration of a preset frequency band of the frequency feature. For example, the same audio segment includes a preset frequency band a-b, the duration of each frequency band a-b in the audio segment is determined, and the feature of the duration is extracted as the duration feature.

The intensity feature is determined based on the intensity of the preset frequency band in the frequency feature. Continuing with the previous example, the preset frequency band is still a-b. The amplitude of the frequency band a-b is determined based on a spectrum diagram to obtain the intensity feature.

The aforementioned audio feature may be any one of the aforementioned features, or may be a combination of multiple groups of features, which is not limited in the embodiments of the present disclosure.

In the embodiments of the present disclosure, the audio data in the device is collected, and the feature extraction is performed. The frequency feature, duration feature and intensity feature can all represent the situation of the audio data. Therefore, these three features are collected to achieve the purpose of accurately identifying the fault condition of the device.

In some embodiments, since the initial audio data includes a plurality of audio segments, the information graph may be constructed based on the audio feature on the basis of obtaining the audio feature of the audio data, which may be implemented as follows:

Step B1: determining similarities between audio segments based on audio sub-features of the audio segments in the audio feature.

Step B2: taking audio segments with similarities meeting a preset threshold as nodes with an associated relationship to construct the information graph.

Figure 3:
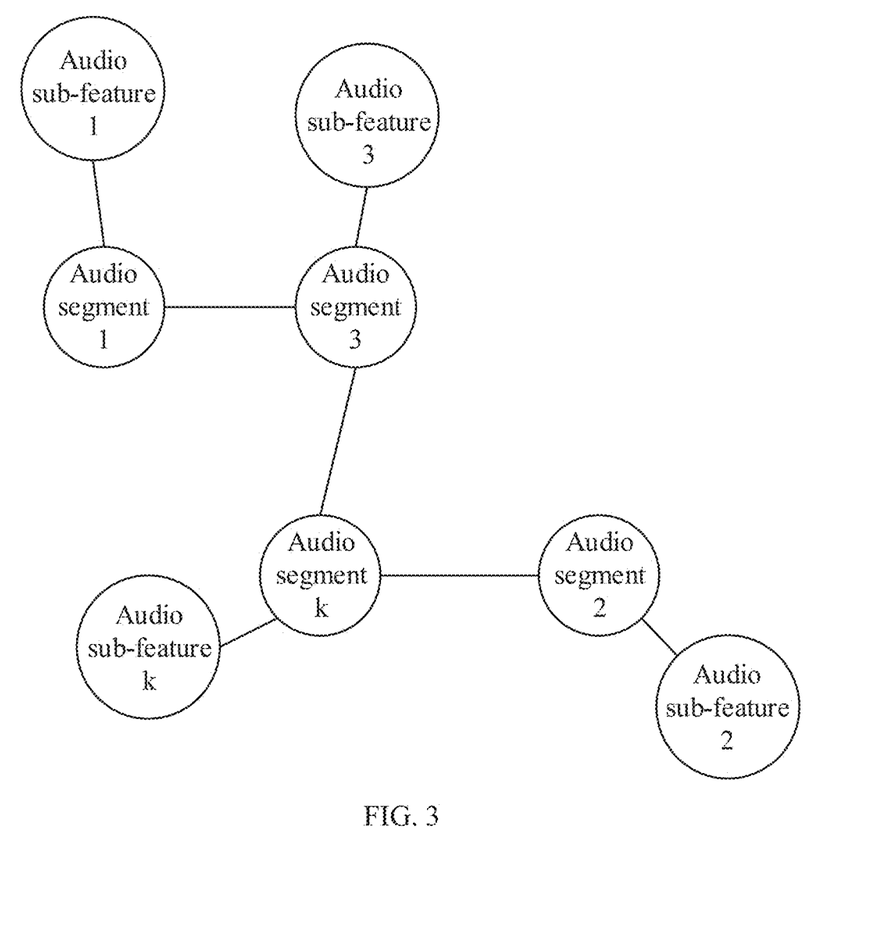
FIG. 3 is a schematic diagram of an information graph according to an embodiment of the present disclosure.

For example, the initial audio data includes audio segment 1, audio segment 2, . . . , audio segment k. The audio sub-feature in each audio segment is extracted. When the audio sub-feature is one of the frequency feature, the duration feature and the intensity feature, the similarity may be directly calculated based on the audio sub-feature in each audio segment. The similarity may be calculated by calculating the cosine similarity. On the basis of obtaining the similarity between audio segments, the audio segments meeting the preset threshold are associated to obtain an information graph. The information diagram is shown in FIG. 3. When the preset threshold is 60%, the similarity between the audio segment 1 and audio segment 3 is 72%, so the audio segment 1 and audio segment 3 are associated; the similarity between the audio segment 1 and audio segment 2 is 32%, so the audio segment 1 and audio segment 2 are not associated; and the similarity between the audio segment 3 and audio segment k is 87%, so the audio segment 3 and audio segment k are associated.

When the audio sub-features are at least two of the frequency feature, the duration feature and the intensity feature, the audio sub-features may be weighted and summed to obtain a comprehensive audio feature of each audio segment, and then the similarity is calculated. The audio sub-feature may also be regarded as a vector including a plurality of elements, and the cosine similarity is used to determine the similarity between different audios.

In the embodiments of the present disclosure, the information graph is constructed by calculating the similarity to clarify the association of each audio segment in the initial audio data, laying a solid foundation for subsequent fault detection.

In some embodiments, the step of obtaining the fault detection result for the target device based on the information graph and the graph neural network model may be implemented as follows:

Step C1: constructing an adjacency matrix based on the information graph.

Since the aforementioned information graph is an adjacency matrix constructed based on the similarity between the audio segments, an adjacency matrix (O) may be constructed based on the similarity between the audio segments in the information graph. The adjacency matrix may be shown as expression (1):

$$O = \begin{bmatrix} aa & ab & \ldots & ak \\ ba & \ddots & & (k-1)k \\ \ldots & \ldots & k(k-1) & kk \end{bmatrix} \quad (1)$$

Here, aa represents the similarity between audio segment 1 and audio segment 1, ab represents the similarity between audio segment 1 and audio segment 2, and so on.

Since there are a large number of node pairs with a similarity of 0 in the information graph, these zero elements may be removed and the adjacency matrix may be converted into a sparse adjacency matrix, in order to facilitate the subsequent processing of the graph neural network model.

Step C2: inputting the adjacency matrix into the graph neural network model to obtain the fault detection result for the target device.

Here, the graph neural network may be a Graph Convolutional Network (GCN), a Graph Attention Network (GAT), etc. The graph neural network usually consists of multiple graph convolutional layers, and each convolutional layer can perform feature extraction and dimensionality reduction operations on the graph data.

In some embodiments, the graph neural network is the GCN as an example, and the manner to obtain the graph neural network through pre-training may be implemented as follows:

Step D1: using a training set to train the GCN model to optimize the parameter and structure of the GCN model.

Typically, the training set consists of audio segments with known labels. Here, the known labels include audio segments in the normal state and audio segments in the abnormal state.

During implementation, for the case where there are many devices and complex processes in the spinning process scenario, training samples can be flexibly collected in the environment where a plurality of identical devices are gathered. For example, when there are a plurality of reactors gathered together, one reactor device may be firstly started, and samples are collected when one reactor device is started; then the second reactor device is started, and training samples are collected when the two reactor devices are started at the same time; then the third reactor device is started, and training samples are collected when the three reactor devices are started at the same time; and so on. When there are n devices, 1–n devices are started in sequence, and a batch of training samples are collected each time one device is added.

Of course, the amount of samples collected can also be increased according to different weather conditions. For example, the audio data in the bad weather such as rainy day or windy day can be collected as the sample data in the training set to cope with the bad environment such as rainy day or windy day.

During the training process, the back-propagation algorithm can be used to update the parameter of the model to minimize the prediction error.

Here, using the back propagation algorithm to update the parameter of the model may be implemented as follows: initializing the parameter of the GCN model, inputting the training set into the GCN model, and calculating the output of each layer of the GCN model. The loss function (such as mean squared error) and its gradient (partial derivative) are calculated. Starting from the output layer, the weight and biased gradient of of each layer are calculated according to the chain rule. The gradient descent method can be used to update the parameter of the GCN model by way of multiplying the learning rate by the gradient.

Step D2: obtaining the graph neural network when the GCN model meets a convergence condition.

In the embodiments of the present disclosure, the feature information can be extracted better from the information graph through the graph neural network model, thereby improving the performance of the fault detection task for the target device.

In some embodiments, the polyester reactor is an important link in the spinning process. According to the four-reactor process, the polyester reactors are divided into: a pre-polycondensation reactor, a first esterification reactor, a second esterification reactor and a final polycondensation reactor. According to the five-reactor process, the polyester reactors are divided into: a first pre-polycondensation reactor, a second pre-polycondensation reactor, a first esterification reactor, a second esterification reactor and a final polycondensation reactor. The reactor is usually large and has a lot of noise around it when running. In order to be able to detect the fault condition of the reactor, when the fault detection result indicates that the reactor is faulty, that is, when the fault detection result is the abnormal state, the following steps may be implemented:

Step E1: obtaining, based on collection time of the initial audio data, an operating parameter of the reactor in a preset time range with the collection time as a benchmark, where the operating parameter includes at least one of: voltage, current, rotation speed and viscosity.

For example, when the collection time is T, the operating parameters of the reactor in s/2 time periods before and s/2 time periods after the moment T are collected, that is, s operating parameters are collected. The collected operating parameters of the reactor may be {voltage A, voltage B, . . . , voltage t, . . . , voltage s}, {current A, current B, . . . , current t, . . . , current s}.

Step E2: determining a fault condition of the reactor based on the operating parameter.

The data range of the reactor under the normal operation is obtained. For example, when the collected voltage operating parameter of the reactor floats at the boundary of the normal voltage data range, it can be determined that a voltage-related device in the reactor is abnormal; when the collected current operating parameter of the reactor floats at the boundary of the normal current data range, it can be determined that a current-related device in the reactor is abnormal.

Step E3: issuing emergency alarm information when determining that the reactor is abnormal based on the operating parameter.

In an embodiment of the present disclosure, when the operating parameter of the reactor is at the boundary of the normal working state, the operating parameter of the reactor is collected based on the abnormal audio data, and the operating parameter of the reactor is compared with the parameter under the normal working state to further determine the fault condition of the reactor.

In another embodiment, when the target device is a reactor required for the spinning process, the device parameter of the reactor and the audio feature of the audio data may also be collected to construct the information graph, which may be implemented as follows:

Step F1: obtaining, based on collection time of the initial audio data, an operating parameter of the reactor in a preset time range with the collection time as a benchmark, where the operating parameter includes at least one of: voltage, current, rotation speed and viscosity; and Step F2: constructing the information graph based on the audio feature and the operating parameter.

Figure 4:
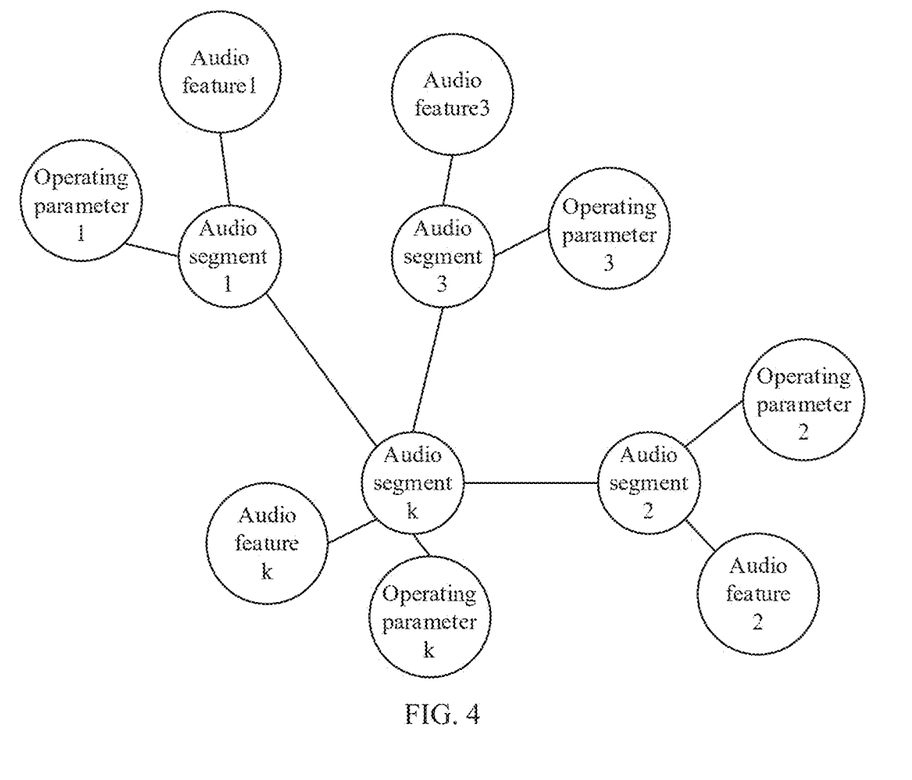
FIG. 4 is another schematic diagram of an information graph according to an embodiment of the present disclosure.

The audio feature and operating parameter are used as the attribute information of the audio segment, and the audio segment is used as a node. The edge is constructed based on the similarity between the audio feature and operating parameter of each audio segment, and the resulting information graph is shown in FIG. 4. When the preset threshold is 60%, the similarity between the audio segment 1 and audio segment 3 is 42%, so the audio segment 1 and audio segment 3 are not associated; the similarity between the audio segment 1 and audio segment k is 67%, so the audio segment 1 and audio segment k are associated; the similarity between the audio segment 2 and audio segment k is 72%, so the audio segment 2 and audio segment k are associated; and the similarity between the audio segment 3 and audio segment k is 87%, so the audio segment 3 and audio segment k are associated.

In some embodiments, in order to facilitate the determination of the specific abnormal location of the reactor device, a pre-established fault analysis graph for fault analysis is obtained, which may be implemented as follows:

Step G1: inputting historical fault records of the reactor into a large model to extract entities at locations of historically abnormal detection points.

The historical fault records may include the fault cause, the fault type, the audio feature when the fault occurs, and the fault solution.

Step G2: obtaining a triple corresponding to the locations of historically abnormal detection points based on the entities at the locations of historically abnormal detection points, where the triple includes the fault cause, the audio feature, and the fault type as the type of the edge therebetween; or the triple includes the fault cause, the fault solution, and the type of the edge therebetween as the fault type.

Step G3: constructing the fault analysis graph based on a plurality of triples.

Since there is also an association relationship among the locations of historically abnormal detection points, specifically the server represents the entities at the locations of historically abnormal detection points extracted in step G2 and an entity relationship among the entities at the locations of historically abnormal detection points in a form conforming to the RDF (Resource Description Framework) representation specification, namely, in a form of triple (subject-predicate-object). Here, the triple is composed of three parts: entity-relationship-entity.

In an embodiment of the present disclosure, based on the degree of association among entities at locations of different historically abnormal detection points in the fault analysis graph, a large language model is called to infer the entities at locations of different historically abnormal detection points, and the inference characteristic of the large language model is used to mine potential entity relationships to obtain more triples, thereby improving the fault analysis graph to improve the accuracy of fault analysis.

In an embodiment of the present disclosure, the natural language processing technology is used to perform entity recognition, entity relationship extraction and knowledge representation for the locations of historically abnormal detection points in the large language model, providing the more precise and accurate semantic understanding and thus improving the generation effect of the fault analysis graph. In addition, the large model can also play a role in knowledge reasoning, reason about the existing knowledge, discover potential relationships and rules, and further expand the fault analysis graph.

It should be noted that, when the fault analysis graph is not updated, there is no need to extract features from the fault analysis graph every time an audio segment is judged, but the graph features are saved for subsequent analysis. Moreover, in order to apply a more complete fault analysis graph, the recent fault information may be stored in a key-value table, and then the fault analysis graph is updated regularly while clearing the fault information stored in the key-value table to save computing resources. Of course, the fault information may also be updated to the fault analysis graph when the fault information stored in the key-value table meets the preset number of items.

Figure 5:
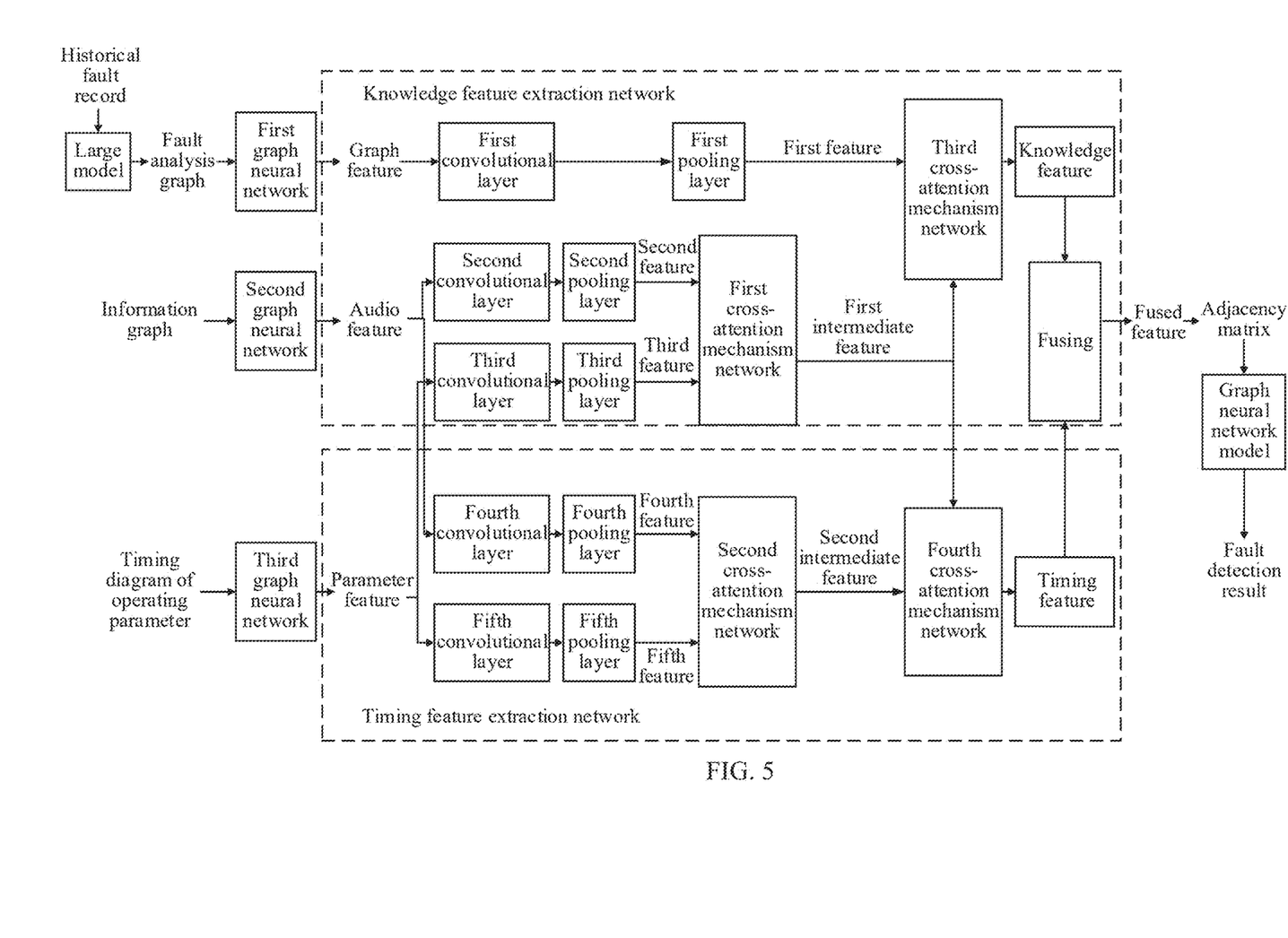
FIG. 5 is an overall schematic diagram of the audio-based device fault detection method according to an embodiment of the present disclosure.

As shown in FIG. 5, the fault analysis graph is input into a first graph neural network for feature extraction to obtain a graph feature. The fault analysis graph is used as a reference to quickly determine a solution to an anomaly when the anomaly is detected.

A second graph neural network is used to perform feature extraction on the information graph to obtain an audio feature.

A timing diagram of the operating parameter is constructed based on the collection time of the operating parameter, and a third graph neural network is used to perform feature extraction on the operating parameter diagram to obtain a parameter feature.

The graph feature, parameter feature and audio feature are input into a knowledge feature extraction network to obtain a knowledge feature; and the parameter feature and audio feature are input into a timing feature extraction network to obtain a timing feature.

Here, the step of inputting the graph feature, parameter feature and audio feature into the knowledge feature extraction network to obtain the knowledge feature may be specifically implemented as shown in FIG. 5: inputting the graph feature into at least one first convolutional layer and a first pooling layer to obtain a first feature; inputting the audio feature into at least one second convolutional layer and a second pooling layer to obtain a second feature; and inputting the parameter feature into at least one third convolutional layer and a third pooling layer to obtain a third feature. The first cross-attention mechanism network is used to process the second feature and the third feature to obtain a first intermediate feature; and the third cross-attention mechanism network is used to process the first intermediate feature and the first feature to obtain the knowledge feature.

Here, the step of inputting the parameter feature and audio feature into the timing feature extraction network to obtain the timing feature may be specifically implemented as shown in FIG. 5: inputting the audio feature into at least one fourth convolutional layer and a fourth pooling layer to obtain a fourth feature; inputting the parameter feature into at least one fifth convolutional layer and a fifth pooling layer to obtain a fifth feature; processing the fourth feature and the fifth feature using the second cross-attention mechanism network, to obtain a second intermediate feature; and processing the second intermediate feature and the first intermediate feature based on the fourth cross-attention mechanism network, to obtain the timing feature.

The knowledge feature and timing feature are fused to obtain a fused feature; and the fused feature is converted into the form of a sparse adjacency matrix and input into the graph neural network model to obtain the fault detection result of the target device. At the same time, if the fault detection result has appeared in the fault analysis graph, the solution corresponding to the anomaly can be obtained.

In another embodiment, on the basis of obtaining an information graph constructed based on the similarity of audio features, the information graph is converted into a first adjacency matrix; and the operating parameters of the reactor in a preset time range with the collection time as a benchmark are obtained based on the collection time of the initial audio data, where the operating parameters include at least one of: voltage, current, rotation speed and viscosity. A second adjacency matrix is constructed based on the operating parameters of the reactor. The second adjacency matrix is constructed based on the similarity between the operating parameters.

The first adjacency matrix and the second adjacency matrix are fused to obtain the information graph. The fusion method may be multiplication, splicing or matrix addition. Since there may be a large number of node pairs with a similarity of 0 in the information graph, these zero elements may be removed and the target adjacency matrix may be converted into a sparse adjacency matrix, in order to facilitate the subsequent processing of the graph neural network model. The sparse adjacency matrix is input into the graph neural network model to obtain the fault detection result for the target device.

In the embodiment of the present disclosure, the operating parameters of the reactor are taken into consideration to facilitate the accurate determination of the detection result of the target device.

Figure 6:
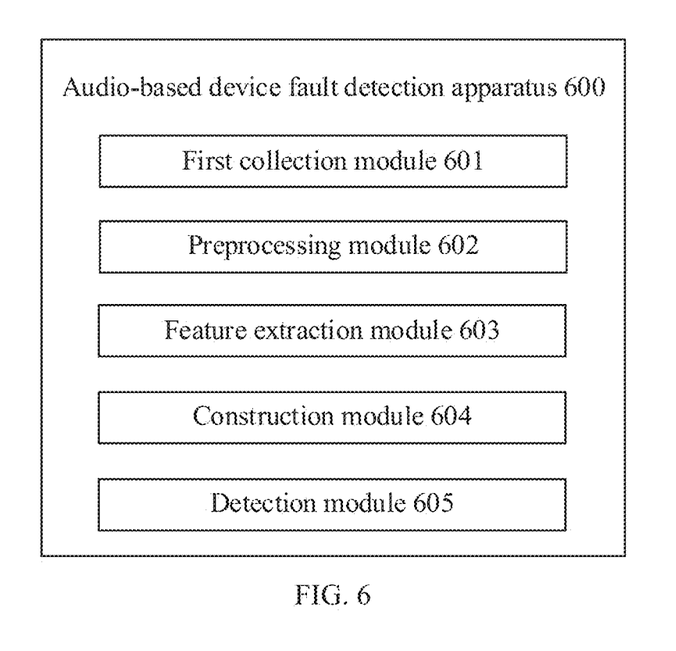
FIG. 6 is a structural schematic diagram of an audio-based device fault detection apparatus according to an embodiment of the present disclosure.

Based on the same technical concept, an embodiment of the present disclosure further provides an audio-based device fault detection apparatus 600, as shown in FIG. 6, including:

a first collection module 601 configured to obtain initial audio data collected by a drone for a target device;

a preprocessing module 602 configured to preprocess the initial audio data to obtain audio data to be detected;

a feature extraction module 603 configured to perform feature extraction on the audio data to be detected to obtain an audio feature of the audio data to be detected;

a construction module 604 configured to construct an information graph based on the audio feature; and a detection module 605 configured to obtain a fault detection result for the target device based on the information graph and a graph neural network model.

In some embodiments, the pre-processing module 602 is configured to:

process the initial audio data based on noise suppression and a silence detection method to obtain first audio data;

perform frame division on the first audio data to obtain second audio data;

process the second audio data using a window function to obtain third audio data; and convert the third audio data into a frequency domain to obtain the audio data to be detected.

In some embodiments, the detection module 605 is configured to:

construct an adjacency matrix based on the information graph; and input the adjacency matrix into the graph neural network model to obtain the fault detection result for the target device.

In some embodiments, the initial audio data includes a plurality of audio segments, and the construction module 604 is configured to:

determine similarities between audio segments based on audio sub-features of the audio segments in the audio feature; and take audio segments with similarities meeting a preset threshold as nodes with an associated relationship to construct the information graph.

In some embodiments, the audio feature includes at least one of: frequency feature, duration feature, and intensity feature.

In some embodiments, the target device is a reactor required for a spinning process, and the construction module 604 is configured to:

obtain, based on collection time of the initial audio data, an operating parameter of the reactor in a preset time range with the collection time as a benchmark, where the operating parameter includes at least one of: voltage, current, rotation speed and viscosity; and construct the information graph based on the audio feature and the operating parameter.

In some embodiments, the target device is a reactor required for a spinning process, and the apparatus further includes an anomaly processing module configured to:

obtain, based on collection time of the initial audio data, an operating parameter of the reactor in a preset time range with the collection time as a benchmark when the fault detection result indicates that the reactor has a fault, where the operating parameter includes at least one of: voltage, current, rotation speed and viscosity;

determine a fault condition of the reactor based on the operating parameter; and issue emergency alarm information when determining that the reactor is abnormal based on the operating parameter.

In some embodiments, the apparatus further includes a second collection module configured to:

control the drone to execute an operation plan to obtain the initial audio data;

where the operation plan includes inspection time, location information of the reactor, and a requirement for the collected initial audio data.

For the description of specific functions and examples of the modules and sub-modules\units of the apparatus of the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

Figure 7:
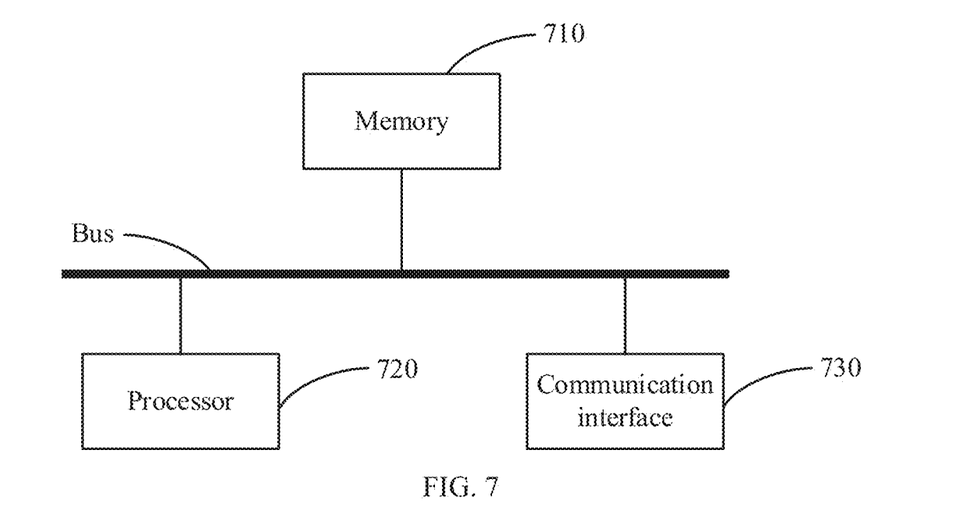
FIG. 7 is a block diagram of an electronic device used to implement the audio-based device fault detection method according to an embodiment of the present disclosure.

FIG. 7 is a structural block diagram of an electronic device according to an embodiment of the present disclosure. As shown in FIG. 7, the electronic device includes: a memory 710 and a processor 720, and the memory 710 stores a computer program that can run on the processor 720. There may be one or more memories 710 and processors 720. The memory 710 may store one or more computer programs, and the one or more computer programs cause the electronic device to perform the method provided in the above method embodiment, when executed by the electronic device. The electronic device may also include: a communication interface 730 configured to communicate with an external device for data interactive transmission.

If the memory 710, the processor 720 and the communication interface 730 are implemented independently, the memory 710, the processor 720 and the communication interface 730 may be connected to each other and complete communication with each other through a bus.

The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the buses are represented by only one thick line in FIG. 7, but it does not represent only one bus or only one type of bus.

Optionally, in a specific implementation, if the memory 710, the processor 720 and the communication interface 730 are integrated on one chip, the memory 710, the processor 720 and the communication interface 730 may communicate with each other through an internal interface.

It should be understood that the above-mentioned processor maybe a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Rate SDRAM (DDR SDRAM), Enhanced SDRAM (ESDRAM), Synchlink DRAM (SLDRAM) and Direct RAMBUS RAM (DR RAM).

The above embodiments maybe implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. An audio-based device fault detection method, comprising:
    obtaining initial audio data collected by a drone for a target device, wherein the target device is a reactor required for a spinning process, and the initial audio data for the reactor is collected by: controlling the drone to execute an operation plan to obtain the initial audio data, the operation plan comprising inspection time, location information of the reactor, and a requirement for the collected initial audio data;
    preprocessing the initial audio data to obtain audio data to be detected;
    performing feature extraction on the audio data to be detected to obtain an audio feature of the audio data to be detected;
    constructing an information graph based on the audio feature;
    obtaining a fault detection result for the target device based on the information graph and a graph neural network model;
    obtaining, based on collection time of the initial audio data, an operating parameter of the reactor in a preset time range with the collection time as a benchmark, in a case of the fault detection result indicates that the reactor has a fault, wherein the operating parameter comprises at least one of: voltage, current, rotation speed or viscosity;
    determining a fault condition of the reactor based on the operating parameter; and
    issuing emergency alarm information after determining that the reactor is abnormal based on the operating parameter.

2. The method of claim 1, wherein the preprocessing the initial audio data to obtain audio data to be detected, comprises:
    processing the initial audio data based on noise suppression and a silence detection method to obtain first audio data;
    performing frame division on the first audio data to obtain second audio data;
    processing the second audio data using a window function to obtain third audio data; and
    converting the third audio data into a frequency domain to obtain the audio data to be detected.

3. The method of claim 1, wherein the obtaining a fault detection result for the target device based on the information graph and a graph neural network model, comprises:
    constructing an adjacency matrix based on the information graph; and
    inputting the adjacency matrix into the graph neural network model to obtain the fault detection result for the target device.

4. The method of claim 1, wherein the initial audio data comprises a plurality of audio segments, and the constructing an information graph based on the audio feature comprises:
    determining similarities between audio segments based on audio sub-features of the audio segments in the audio feature; and
    taking audio segments with similarities meeting a preset threshold as nodes with an associated relationship to construct the information graph.

5. The method of claim 1, wherein the audio feature comprises at least one of: frequency feature, duration feature, or intensity feature.

6. The method of claim 1, wherein the constructing an information graph based on the audio feature comprises:
    obtaining, based on collection time of the initial audio data, an operating parameter of the reactor in a preset time range with the collection time as a benchmark, wherein the operating parameter comprises at least one of: voltage, current, rotation speed or viscosity; and
    constructing the information graph based on the audio feature and the operating parameter.

7. An electronic device, comprising:
    at least one processor; and
    a memory connected in communication with the at least one processor;
    wherein the memory stores an instruction executable by the at least one processor, and the instruction, when executed by the at least one processor, enables the at least one processor to execute:
    obtaining initial audio data collected by a drone for a target device, wherein the target device is a reactor required for a spinning process, and the initial audio data for the reactor is collected by: controlling the drone to execute an operation plan to obtain the initial audio data, the operation plan comprising inspection time, location information of the reactor, and a requirement for the collected initial audio data;
    preprocessing the initial audio data to obtain audio data to be detected;
    performing feature extraction on the audio data to be detected to obtain an audio feature of the audio data to be detected;
    constructing an information graph based on the audio feature;
    obtaining a fault detection result for the target device based on the information graph and a graph neural network model;
    obtaining, based on collection time of the initial audio data, an operating parameter of the reactor in a preset time range with the collection time as a benchmark, in a case of the fault detection result indicates that the reactor has a fault, wherein the operating parameter comprises at least one of: voltage, current, rotation speed or viscosity;

determining a fault condition of the reactor based on the operating parameter; and issuing emergency alarm information after determining that the reactor is abnormal based on the operating parameter.

8. The electronic device of claim 7, wherein the preprocessing the initial audio data to obtain audio data to be detected, comprises:

processing the initial audio data based on noise suppression and a silence detection method to obtain first audio data;

performing frame division on the first audio data to obtain second audio data;

processing the second audio data using a window function to obtain third audio data; and converting the third audio data into a frequency domain to obtain the audio data to be detected.

9. The electronic device of claim 7, wherein the obtaining a fault detection result for the target device based on the information graph and a graph neural network model, comprises:

constructing an adjacency matrix based on the information graph; and inputting the adjacency matrix into the graph neural network model to obtain the fault detection result for the target device.

10. The electronic device of claim 7, wherein the initial audio data comprises a plurality of audio segments, and the constructing an information graph based on the audio feature comprises:

determining similarities between audio segments based on audio sub-features of the audio segments in the audio feature; and taking audio segments with similarities meeting a preset threshold as nodes with an associated relationship to construct the information graph.

11. The electronic device of claim 7, wherein the audio feature comprises at least one of: frequency feature, duration feature, or intensity feature.

12. The electronic device of claim 7, wherein the constructing an information graph based on the audio feature comprises:

obtaining, based on collection time of the initial audio data, an operating parameter of the reactor in a preset time range with the collection time as a benchmark, wherein the operating parameter comprises at least one of: voltage, current, rotation speed or viscosity; and constructing the information graph based on the audio feature and the operating parameter.

13. A non-transitory computer-readable storage medium storing a computer instruction thereon, wherein the computer instruction is used to cause a computer to execute:

obtaining initial audio data collected by a drone for a target device, wherein the target device is a reactor required for a spinning process, and the initial audio data for the reactor is collected by: controlling the drone to execute an operation plan to obtain the initial audio data, the operation plan comprising inspection time, location information of the reactor, and a requirement for the collected initial audio data;

preprocessing the initial audio data to obtain audio data to be detected;

performing feature extraction on the audio data to be detected to obtain an audio feature of the audio data to be detected;

constructing an information graph based on the audio feature;

obtaining a fault detection result for the target device based on the information graph and a graph neural network model;

obtaining, based on collection time of the initial audio data, an operating parameter of the reactor in a preset time range with the collection time as a benchmark, in a case of the fault detection result indicates that the reactor has a fault, wherein the operating parameter comprises at least one of: voltage, current, rotation speed or viscosity;

determining a fault condition of the reactor based on the operating parameter; and issuing emergency alarm information after determining that the reactor is abnormal based on the operating parameter.

14. The non-transitory computer-readable storage medium of claim 13, wherein the preprocessing the initial audio data to obtain audio data to be detected, comprises:

processing the initial audio data based on noise suppression and a silence detection method to obtain first audio data;

performing frame division on the first audio data to obtain second audio data;

processing the second audio data using a window function to obtain third audio data; and converting the third audio data into a frequency domain to obtain the audio data to be detected.

15. The non-transitory computer-readable storage medium of claim 13, wherein the obtaining a fault detection result for the target device based on the information graph and a graph neural network model, comprises:

constructing an adjacency matrix based on the information graph; and inputting the adjacency matrix into the graph neural network model to obtain the fault detection result for the target device.

16. The non-transitory computer-readable storage medium of claim 13, wherein the initial audio data comprises a plurality of audio segments, and the constructing an information graph based on the audio feature comprises:

determining similarities between audio segments based on audio sub-features of the audio segments in the audio feature; and taking audio segments with similarities meeting a preset threshold as nodes with an associated relationship to construct the information graph.

17. The non-transitory computer-readable storage medium of claim 13, wherein the audio feature comprises at least one of: frequency feature, duration feature, or intensity feature.

18. The non-transitory computer-readable storage medium of claim 13, wherein the constructing an information graph based on the audio feature comprises:

obtaining, based on collection time of the initial audio data, an operating parameter of the reactor in a preset time range with the collection time as a benchmark, wherein the operating parameter comprises at least one of: voltage, current, rotation speed or viscosity; and constructing the information graph based on the audio feature and the operating parameter.

\* \* \* \* \*